(12) United States Patent
Dantzig et al.

(10) Patent No.: US 7,020,841 B2
(45) Date of Patent: Mar. 28, 2006

(54) SYSTEM AND METHOD FOR GENERATING AND PRESENTING MULTI-MODAL APPLICATIONS FROM INTENT-BASED MARKUP SCRIPTS

(75) Inventors: Paul M. Dantzig, Scarsdale, NY (US); Robert Filepp, Westport, CT (US); Yew-Huey Liu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 09/876,714

(22) Filed: Jun. 7, 2001

(65) Prior Publication Data

US 2003/0071833 A1    Apr. 17, 2003

(51) Int. Cl.
 *G06F 3/00* (2006.01)
(52) U.S. Cl. ............... 715/727; 715/730; 715/764; 715/716; 715/718; 715/728; 715/729
(58) Field of Classification Search ............... 345/428, 345/727, 728, 730, 760, 764, 716; 715/727, 715/728, 729, 730, 716, 718, 760, 764
 See application file for complete search history.

(56) References Cited

U.S. PATENT DOCUMENTS

| | | | |
|---|---|---|---|
| 5,122,972 A | 6/1992 | Richards et al. | |
| 5,155,806 A | 10/1992 | Hoeber et al. | |
| 5,546,521 A | 8/1996 | Martinez | |
| 5,566,291 A | 10/1996 | Boulton et al. | |
| 5,664,061 A | 9/1997 | Andreshak et al. | |
| 5,699,486 A | 12/1997 | Tullis et al. | |
| 5,748,186 A * | 5/1998 | Raman ................. | 715/500.1 |
| 5,884,266 A | 3/1999 | Dvorak | |
| 6,012,030 A | 1/2000 | French-St. George et al. | |
| 6,101,472 A | 8/2000 | Giangarra et al. | |
| 6,175,820 B1 * | 1/2001 | Dietz ................. | 704/235 |
| 2001/0043234 A1 * | 11/2001 | Kotamarti ............. | 345/746 |
| 2002/0032564 A1 * | 3/2002 | Ehsani et al. ........... | 704/235 |

FOREIGN PATENT DOCUMENTS

WO    WO 00/21232    4/2000

OTHER PUBLICATIONS

U.S. Appl. No. 09/544,823 filed Apr. 6, 2000 entitled "Methods and Systems for Multi-Modal Browsing and Implementation of a Conversational Markup Language";.

* cited by examiner

*Primary Examiner*—Raymond J. Bayerl
*Assistant Examiner*—Michael Roswell
(74) *Attorney, Agent, or Firm*—Frank V. DeRosa; F.Chau & Associates,LLC (57) ABSTRACT

Systems and methods are provided for rendering modality-independent scripts (e.g., intent-based markup scripts) in a multi-modal environment, whereby a user can interact with an application using a plurality of modalities (e.g., speech and GUI) with I/O events being automatically synchronized over the plurality of modalities presented. In one aspect, immediate synchronized rendering of the modality-independent document in each of the supported modalities is provided. In another aspect, deferred rendering and presentation of intent-based scripts to an end user is provided, wherein a speech markup language script (such as a VoiceXML document) is generated from the modality-independent script and rendered (via, e.g., VoiceXML browser) at a later time.

31 Claims, 4 Drawing Sheets

SYSTEM AND METHOD FOR GENERATING AND PRESENTING MULTI-MODAL APPLICATIONS FROM INTENT-BASED MARKUP SCRIPTS

COPYRIGHT NOTICE

A portion of the disclosure of this patent document contains material which is subject to copyright protection. The copyright owner has no objection to the facsimile reproduction by any one of the patent document or the patent disclosure, as it appears in the patent and Trademark Office patent file or records, but otherwise reserves all copyright rights whatsoever.

BACKGROUND

1. Technical Field

The present invention relates generally to a user interface for rendering intent-based markup language scripts in a multi-modal environment and, more specifically, systems and methods for presenting a modality-independent markup script in a plurality of modalities (e.g., speech and GUI) and synchronizing I/O (input/output) events between the different modalities presented.

2. Description of Related Art

The computing world is evolving towards an era where billions of interconnected pervasive clients will communicate with powerful information servers. Indeed, this millennium will be characterized by the availability of multiple information devices that make ubiquitous information access an accepted fact of life. This evolution towards billions of pervasive devices being interconnected via the Internet, wireless networks or spontaneous networks (such as Bluetooth and Jini) will revolutionize the principles underlying man-machine interaction. In the near future, personal information devices will offer ubiquitous access, bringing with them the ability to create, manipulate and exchange any information anywhere and anytime using interaction modalities most suited to an individual's current needs and abilities. Such devices will include familiar access devices such as conventional telephones, cell phones, smart phones, pocket organizers, PDAs and PCs, which vary widely in the interface peripherals they use to communicate with the user.

The increasing availability of information, along with the rise in the computational power available to each user to manipulate this information, brings with it a concomitant need to increase the bandwidth of man-machine communication. The ability to access information via a multiplicity of appliances, each designed to suit the individual's specific needs and abilities at any given time, necessarily means that these interactions should exploit all available input and output (I/O) modalities to maximize the bandwidth of man-machine communication. Indeed, users will come to demand such multi-modal interaction in order to maximize their interaction with information devices in hands-free, eyes-free environments.

The current infrastructure is not configured for providing seamless, multi-modal interaction between man and machine, although new and emerging protocols are being generated and advanced to provide such broad multi-modal interaction. Indeed, various components are preferred to provide seamless multi-modal interaction. One component comprises an application user interface that preferably provides coordinated, synchronized, multi-modal user interaction over a plurality of modalities (e.g., speech, GUI, etc.).

For example, one thinks of the various manners in which users interact with a computer as "user interfaces." Thus, the keyboard/mouse/display may be viewed as one user interface, which the microphone/sound card/speakers may be considered a different "user interface" or modality. One can readily appreciate the advantages associated with a speech-enabled application that can be controlled through voice/aural interface while simultaneously retaining the ability to provide control via the display/keyboard/pointing device interface. For example, an operator of a motor vehicle might desire to interact in a hands-free manner with a navigation system to obtain driving directions through a speech interface, while being able to view an image of a selected map though a visual interface to gain a better sense of orientation.

Another component for providing seamless, multi-modal interaction comprises applications that are authored using a modality-independent programming paradigm, wherein such applications can be created once and rendered and presented across different user interfaces or modalities (a concept referred to as "single authoring"). The adoption of single authored, modality-independent applications has been slow, due in part to difficulties in dealing with the differences in presentation styles across interfaces. In fact, new markup languages (e.g., VoiceXML and WML (Wireless Markup Language) have been developed to address the vagaries of new user interfaces. By way of example, IVR (interactive voice response) services and telephone companies provide voice portals having only speech I/O capabilities. The IVR systems may be programmed using, e.g., proprietary interfaces (state tables, scripts beans, etc.) or VoiceXML (a current speech ML standard) and objects. With a voice portal, a user may access an IVR service and perform voice browsing using a speech browser (or using telephone key pads). Unfortunately, a client device having only GUI capability would not be able to directly access information from a voice portal. Likewise, a client/access device having only speech I/O would not be able to access information in a GUI modality.

Accordingly, a need exists for systems and methods (e.g., an application user interface) to render modality-independent applications in a multi-modal environment.

SUMMARY OF THE INVENTION

The present invention is directed to systems and methods for rendering modality-independent scripts (e.g., intent-based markup scripts) in a multi-modal environment and, in particular, to a multi-modal user interface for an application, whereby the user can interact with the application using a plurality of modalities (e.g., speech and GUI). Preferably, the multi-modal interface automatically synchronizes I/O events over the plurality of modalities presented. In a preferred embodiment, the multi-modal application user interface affords a user a choice of speech and/or graphical user interface modalities, in which modality-specific details of presentation are automatically determined by the system through the use of built-in rules and optional user-supplied preferences, and need not be included in the dialog specification.

In one aspect of the present invention, a system for presenting an application in a plurality of modalities comprises:

a multi-modal manager for parsing a modality-independent document to generate a traversal model that maps components of the modality-independent document to at least a first and second modality-specific representation;

a speech user interface manager for rendering and presenting the first modality-specific representation in a speech modality;

a GUI (graphical user interface) manager for rendering and presenting the second modality-specific representation in a GUI modality;

an event queue monitor for detecting GUI events;

an event queue for storing captured GUI events; and a plurality of methods, that are called by the speech user interface manager, for synchronizing I/O (input/output) events across the speech and GUI modalities.

In one aspect, the system provides immediate rendering of the modality-independent document in each of the supported modalities. In another aspect, the system provides deferred rendering and presentation of intent-based scripts to an end user, wherein the system comprises a transcoder for generating a speech markup language script (such as a VoiceXML document) from the modality-independent script and rendered (via, e.g., VoiceXML browser) at a later time. Both immediate and deferred renderings may be performed in either speech-only or multi-modal fashion.

In another aspect of the present invention, methods for synchronizing I/O events comprise a first method for polling for the occurrence of GUI events in the event queue and a second method for reflecting speech events back to the GUI manager and posting speech events to the multi-modal manager.

In yet another aspect of the invention, a method for presenting an application in a plurality of modalities comprise the steps of:

retrieving a modality-independent document from one of local and remote storage;

parsing the modality-independent document using parsing rules obtained from one of local or remote storage;

converting the modality-independent document to a first intermediate representation that can be rendered by a speech user interface modality;

converting the modality-independent document to a second intermediate representation that can be rendered by a GUI (graphical user interface) modality;

building a cross-reference table by which the speech user interface can access components comprising the second intermediate representation;

rendering the first and second intermediate representations in their respective modality; and receiving a user input in one of the GUI and speech user interface modalities to enable multi-modal interaction and control the document presentation.

In other aspects of the present invention, mechanisms are provided for automatic generation of application-specific "help" information in the form of a description of the hierarchy and navigational flow of the application, analyzing the manner in which navigation through the modality-independent script may be performed, scripted emulation of point-and-click navigation applied to the speech interface, automatic insertion of program calls into the voice script invoking functions that will synchronize events occuring at the field level between the speech/aural interface and the GUI interface, and automatic insertion of program calls into the voice script invoking user supplied functions to perform variable initialization and other application-specific tasks.

In another aspect, the present invention comprises a mechanism for enabling flexible user navigation, help, contextual help, and feedback suitable to each presentation modality during the dialog interaction. The method of user navigation comprises both hierarchical and nonhierarchical traversal options. The system synchronizes the states of each presentation modality during the dialog interaction.

More specifically, in one aspect, method for providing global help information when presenting a modality-independent document comprises the steps of:

preparing an internal representation of a structure and component attributes of the modality-independent document;

building a grammar comprising rules for resolving specific spoken requests;

processing a spoken request utilizing the grammar rules; and presenting an aural description of the modality-independent document in response to the spoken request.

In another aspect, a method for providing contextual help information when presenting a modality-independent document comprises the steps of:

preparing an internal representation of a structure and component attributes of the modality-independent document;

building a grammar comprising rules for resolving specific spoken requests;

processing a spoken request utilizing the grammar rules; and presenting an aural description of the components, attributes, and methods of interaction of the modality-independent document in response to the spoken request.

In yet another aspect, a method for providing feedback information when presenting a modality-independent document comprises the steps of:

preparing an internal representation of the structure and component attributes of the modality-independent document;

building a grammar comprising rules for resolving specific spoken requests;

processing a spoken request and resolving the spoken request utilizing the grammar rules;

obtaining state and value information regarding specified components of the document from the internal representation of the document; and presenting an aural description of the content values associated with document components in response to the spoken request.

In another aspect, a method for aurally spelling out content values associated with components of a modality-independent document comprises the steps of:

preparing an internal representation of a structure and component attributes of the modality-independent document;

building a grammar comprising rules for resolving specific spoken requests;

processing a spoken request utilizing the grammar rules;

obtaining state and content value information regarding specified components of the document from the internal representation of the document; and presenting each character of the content value information requested in response to the spoken request.

In another aspect, the step of presenting each character of the content value information comprises the step of inserting pauses between each character of the content value information to be presented.

These and other aspects, features, and advantages of the present invention will become apparent from the following detailed description of the preferred embodiments, which is to be read in connection with the accompanying drawings.

DETAILED DESCRIPTION OF PREFERRED EMBODIMENTS

The present invention is generally directed to systems and methods for rendering modality-independent scripts (e.g., intent-based markup scripts) in a multi-modal environment. Preferably, the systems and methods described herein are implemented for generating a multi-modal user interface for an application, whereby the user can interact with the application using a plurality of modalities (e.g., speech and GUI). In addition, the multi-modal interface automatically synchronizes I/O events over the plurality of modalities presented. For instance, in an exemplary embodiment described herein, a multi-modal interface integrates and synchronizes voice synthesis and recognition functions with the GUI presentation layer of an application at the time of presentation to a user.

The systems and methods described herein preferably support programming models that are premised on the concept of "single-authoring" wherein content is expressed in a "user-interface" (or modality) neutral manner. More specifically, the present invention preferably support interaction-based programming models that separate application programming into content aspects, presentation aspects and interaction aspects. An example of a single authoring, interaction-based programming paradigm, that can be implemented herein is described in U.S. patent application Ser. No. 09/544,823, filed on Apr. 6, 2000, entitled: "*Methods and Systems For Multi-Modal Browsing and Implementation of A Conversational Markup Language*", which is commonly assigned and fully incorporated herein by reference.

As described in the above-incorporated U.S. Ser. No. 09/544,823, one embodiment of IML preferably comprises a high-level XML (eXtensible Markup Language)-based script for representing interaction "dialogs" or "conversations" between user and machine, which is preferably implemented in a modality-independent, single authoring format using a plurality of "conversational gestures." The conversational gestures comprise elementary dialog components (interaction-based elements) that characterize the dialog interaction with the user. Each conversational gesture provides an abstract representation of a dialog independent from the characteristics and UI offered by the device or application that is responsible for rendering the presentation material. In other words, the conversational gestures are modality-independent building blocks that can be combined to represent any type of intent-based user interaction. A gesture-based IML, for example, allows an application to be written in a manner which is independent of the content/application logic and presentation (i.e., gesture-based CML encapsulates man-machine interaction in a modality-independent manner).

For example, as explained in detail in the above incorporated U.S. Ser. No. 09/544,823, a conversational gesture message is used to convey information messages to the user, which may be rendered, for example, as a displayed string or a spoken prompt. In addition, a conversational gesture select is used to encapsulate dialogs where the user is expected to select from a set of choices. The select gesture encapsulates the prompt, the default selection and the set of legal choices. Other conversational gestures are described in the above-incorporated Ser. No. 09/544,823. The IML script can be transformed using any suitable transformation protocol, e.g., XSL (eXtensible Style Language) transformation rules or DOM (Document Object Model), into one or more modality-specific user interfaces.

Figure 1:
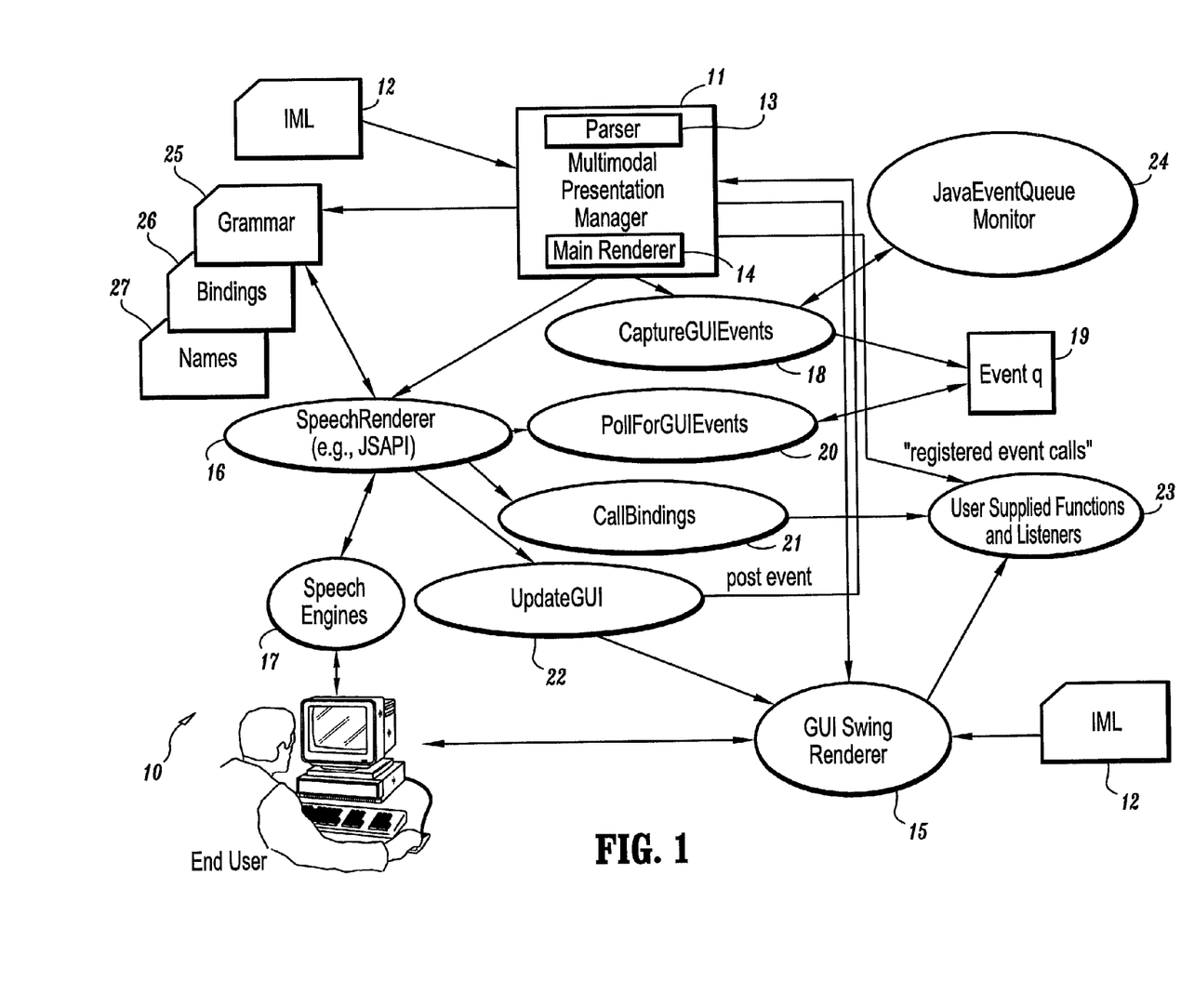
FIG. 1 is a block/flow diagram of a system/method for providing a multi-modal user interface according to an embodiment of the present invention.
Figure 2:
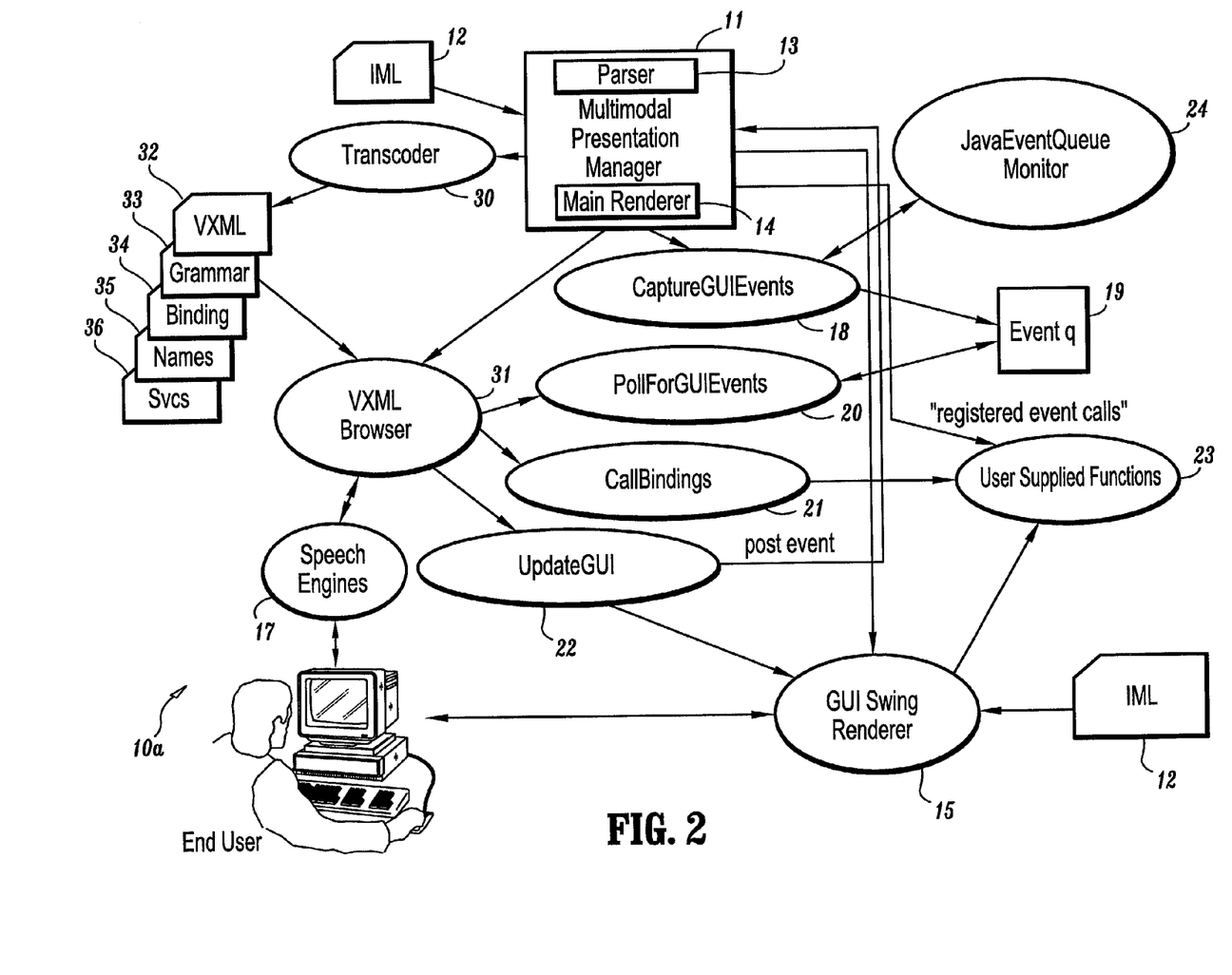
FIG. 2 is a block/flow diagram of a system/method for providing a multi-modal user interface according to another embodiment of the present invention.

FIGS. 1 and 2 are block diagrams illustrating systems and methods for rendering and presenting intent-based markup scripts in one or modalities in accordance with preferred embodiments of the present invention. In particular, FIGS. 1 and 2 illustrate exemplary systems and methods for implementing an application user interface that renders and presents single authored, "intent-based" markup languages in either a speech modality or GUI modality (i.e., mono-modal) or both speech and GUI modalities (i.e., multi-modal). When operating in a multi-modal manner, an application user interface according to an embodiment of the present invention provides a set of runtime methods which are used to integrate and synchronize actions occurring across the multiple user interfaces as the application is presented to the user. In the embodiment depicted in FIG. 1, a system and method is provided for immediate rendering and presentation of intent-based scripts to an end-user. In the embodiment depicted in FIG. 2, a system and method is provided for deferred rendering and presentation of intent-based scripts to an end user, wherein a speech markup language script (such as a VoiceXML document) is derived from an intent-based markup language script and rendered (via, e.g., VoiceXML browser) at a later time. Both immediate and deferred renderings may be performed in either speech-only or multi-modal fashion.

Further, as explained below, the present invention preferably provides mechanisms for: (1) automatically generating application-specific "help" information in the form of a description of the hierarchy and navigational flow of an application; (2) analyzing the manner in which navigation through the intent-based script may be performed; (3) emulating point-and-click navigation applied to a speech interface; (4) automatically inserting program calls into an optional voice script to invoke functions that will synchronize events occurring at the field level between a speech/aural interface and a GUI interface; and (5) automatically inserting program calls into the optional voice script to invoke user supplied functions to perform variable initialization and other application-specific tasks. Although preferred multi-modal systems and methods will be described herein with reference to speech and GUI modalities, those of ordinary skill in the art can readily envision and implement other modalities (such as constrained GUI, WML, etc.) in a multi-modal interface in accordance with the teachings herein.

Referring now to FIG. 1, a diagram illustrates a system (e.g., application user interface) for providing immediate rendering and presentation of an intent-based script. The system 10 comprises a multi-modal presentation manager 11 that provides a runtime environment which integrates and synchronizes a plurality of "presentation interfaces", enabling I/O events initiated at one "interface" to be reflected across all active "interfaces". For example, as noted above, in a preferred embodiment, the multi-modal presentation manager 11 provides a mechanism to automatically integrate and synchronize voice synthesis and speech recognition functions with the presentation layer of applications.

In general, the multi-modal presentation manager 11 receives and processes IML input files 12 comprising, e.g., an application. The IML files 12 comprise a plurality of modality-independent components or instances (e.g., conversational gestures as described in the above-incorporated U.S. Ser. No. 09/544,823). In a preferred embodiment, the components and attributes of the IML file have component names associated therewith. As explained below, the component names of the IML file 12 provide a mechanism to correlate the different modalities presented and provide targets for navigation.

The multi-modal presentation manager 11 comprises an IML parser and analyzer 13 and a main renderer 14. In general, the parser and analyzer 13 parses IML tags and attributes and builds a set of internal vectors and hash tables which represent the navigable components of the IML script. The parsing process generates a plurality of intermediate files 25, 26, and 27, and results in a traversal model that maps the modality-independent IML instances to appropriate modality-specific representations using suitable transformation rules (e.g., XSLT) that add the information that is needed to realize modality-specific user interaction. A detailed discussion of a preferred parsing process is described below with reference to FIG. 4. As noted above, depending on options selected, the IML script can be rendered immediately or, as described below with reference to FIG. 2, the IML parsing and analysis process may invoke operations to generate a VoiceXML script based on the input IML script and defer actual rendering.

The main renderer 14 of the multi-modal presentation manager 11 mediates among the modalities presented. In a preferred embodiment, the main renderer 14 initiates three processing threads: (i) one thread comprising a GUI presentation manager 15 (ii) a second thread which comprises a speech renderer 16, wherein the speech renderer 16 utilizes a plurality of speech engines 17 (e.g., speech recognition, TTS (text-to-speech synthesis), NLU (natural language understanding, NLG (natural language generation) engines; and (iii) a third thread, CaptureGUIEvents 18 which captures GUI events that are detected by an event queue monitor 24. The CaptureGUIEvents 18 logically associates a GUI event with the corresponding IML field, and then stores the captured GUI event in an event queue 19.

The event queue monitor 24 provides a set of functions which enable multiple event listeners to be actively listening for changes to a specified GUI component. This mechanism allows a properly drafted application to "sniff" GUI interactions. In a preferred embodiment, the event queue monitor 24 comprises the commercially available Java Accessibility Package (as described for example at http://java.sun.com/products/jfc/jaccess-1.2/doc/guide.html.

In the case of deferred rendering as explained below with reference to FIG. 2, a Voice XML browser 31 is preferably instantiated (instead of the speech renderer 16) for rendering a VoiceXML document generated from the IML script.

In a preferred embodiment, the speech renderer 16 is based on JSAPI (Java Speech Application Program Interface), which defines a standard, cross-platform interface to speech synthesis and recognition engines, which is well-known to those skilled in the art. It is to be understood, however, that other protocols may be implemented in lieu of JSAPI.

The system 10 also provides a set of runtime methods (utility services) which are used to integrate and synchronize actions occuring across multiple user interfaces when the application is presented to the user. These methods preferably comprise a PollforGUIEvents method 20 for polling for the occurrence of GUI interface events in the event queue 19, a CallBindings method 24 for invoking user-specified programs and listeners 23, and an UpdateGUI method 22 for reflecting speech-activated events back to the GUI interface and posting the occurrence of speech-activated events and passing the affected component names and new values back to registered user programs.

The user-specified programs (e.g., callback functions) and listeners 23 comprise application classes (e.g., Java classes) that are specified in an IML file in the form of Bindings 26. These Bindings 26 are executed by the renderers 15, 16 accordingly. In accordance with the present invention, the IML application developer can insert event calls to the user-specified programs 23 at desired locations in the IML script. Upon initialization of an application, these event calls are registered with the multi-modal presentation manager 11. Further, the application-specific action listeners are registered with the multi-modal presentation manager 11 by means of IML definitions. The application developer will provide the programs 23 (or callback functions) that are posted to handle the application details when events occur. These runtime methods will be described in further detail below.

In a preferred embodiment, the multi-modal presentation manager 11 controls the application, i.e., it functions similarly to a Web Browser or a desktop in that it is initiated as a "stand-alone" and processes the IML input files 12. The multi-modal renderer is preferably invoked from a command line or bat file. Specific IML files and DATAGROUP names are passed as command line arguments to the main renderer 14 which then invokes the GUI swing renderer 15 and speech renderer 16. In another embodiment, multi-modal presentation manager 11 may be initiated from within a user application program.

Referring now to FIG. 2, a diagram illustrates a system (e.g., application user interface) for providing deferred rendering and presentation of an intent-based script. The system and method depicted in FIG. 2 is similar to FIG. 1 except that the system and method of FIG. 2 provides deferred rendering with generation of preferably a VXML script as a separate step. More specifically, the system 10*a* comprises a transcoder 30 for converting an IML script 12 to a VoiceXML script 32 and a VoiceXML browser 31 for deferred rendering of the VoiceXML script 32. A services file 36 is used to register the functions (e.g., methods 20, 21, 22) that are called by the VoiceXML browser 31.

VoiceXML is a programming language that has been proposed as a standard for declaratively describing the conversational UI for, e.g., speech browsers and IVR platforms (see, www.voicexml.org) and is well-known in the art. It is to be appreciated that although VoiceXML is primarily directed to scripted speech-enabled applications such as automated customer service applications, the standard does provide programming exits and constructs which are useful in speech-enabling GUIs. It is to be understood that any suitable speech browser capable of processing VoiceXML scripts may be employed herein. A preferred embodiment of the VoiceXML browser 31 is described, for example, in the International Appl. No. PCT/US99/23008, entitled "Conversational Browser and Conversational Systems", which has been filed in the United States National Phase and assigned U.S. Ser. No. 09/806,544, and which is commonly assigned an incorporated herein by reference. This application also describes a SpeechML language where various portions of which have been adopted for the VoiceXML standard.

Figure 3:
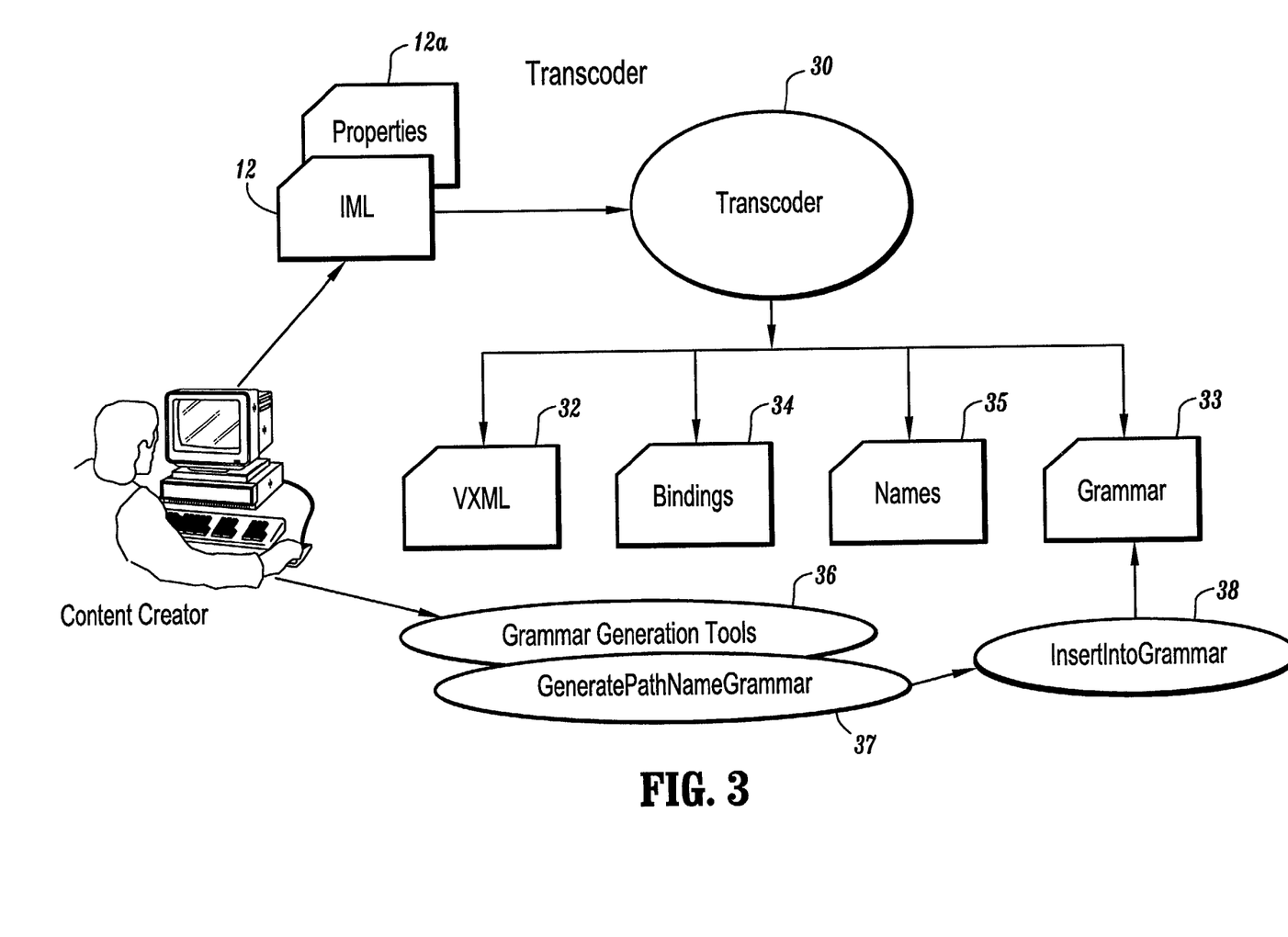
FIG. 3 is a block/flow diagram of a system/method for transcoding a modality-independent, intent-based markup script into a modality-specific markup script, according to an embodiment of the present invention.

With additional reference to FIG. 3, the Transcoder 30 is a tool which enables application developers to automatically generate Voice XML scripts 32 from previously specified IML scripts based on XML. In a preferred embodiment, the Transcoder 30 automatically performs the functions such as: (1) analyzing intent-based scripts and creating appropriate Voice XML tags to realize the intent; (2) generating appropriate variables to be included in the Voice XML script; (3) generating conditional procedural blocks to be executed by the Voice XML interpreter; (4) analyzing the manner in which navigation through the intent-based script may be performed, and providing scripted emulation of point-and-click navigation in the speech environment; (5) generating files comprising lists of user-supplied runtime functions correlating the functions to Voice XML variables; (6) generating generalized "help" information into the Voice XML script and providing navigation to and from the "help" feature; (7) generating application-specific "help" information, in the form of a description of the hierarchy and navigational flow of the application, which is inserted into the Voice XML script. Properties files 12a are used to resolve text declarations thereby providing local language support Furthermore, the Transcoder 30 provides tools to enable application developers to build specific grammars which, in a preferred embodiment, are formatted according to the JSGF (Java Speech Grammar Format). These grammars correlate specified utterances to specified values. Grammar generation tools 36 may be executed before presentation of the application to the user, or may be executed dynamically during the presentation of the application to the user.

An example of such a tool is Generate Path Name Grammar 37 which generates appropriate grammars from computer file names. Generate Path Name Grammar 37 takes as input a grammar file name, a field name, and a path name. It will open the grammar file 33, find the specified field, and create a grammar directive which will be used to resolve a user speech input to a text string. For instance, the command Generate Path Name Grammar x.gram y c:\\src\my.doc will place the following grammar directive "(c colon back-slash back-slash src back-slash my dot doc) {c:\\src\my.doc}" into the field y in the grammar file x.gram.

Referring again to FIG. 2, during runtime, the set of preferred utility functions 20, 21, 22 may be invoked from the Voice XML script via the VXML browser 31. The Transcoder 30 automatically inserts calls to the utility functions at appropriate points in the generated VXML script. As noted above, however it is preferably the responsibility of the application program using this service to provide programs or "callback" functions which will be posted to handle the application details when events occur.

As described above, the present invention provides for either immediate rendering of IML scripts (FIG. 1) or deferred rendering with generation of a VXML script as a separate step (FIG. 2). This decision of which option to select is left to the application designer. The application designer will weigh the benefits of immediate rendering versus VXML generation and interpretation. The immediate rendering of IML through the use of JSAPI has advantages associated therewith. For instance, immediate rendering provides the ability to generate grammar rules dynamically from values returned by application programs. In addition, immediate rendering affords the ability to select a large dictation grammar to enhance user interaction with "freeform" text fields and to select national language support and standardized prompts at the time of presentation to the user. Further, immediate rendering of IML reduces the number of intermediate files generated and results in overall reduction of resources consumed.

There are advantages to deferred rendering, VXML generation and interpretation. Many available speech-enablement systems analyze content at the time of presentation to the user. The immediate analysis of content has several drawbacks amongst which are potential delays in response time (due to analysis) and a greater potential for ambiguities to arise during speech recognition due to the inability to create a limited and efficient set of speech grammars related to the content. Interpretation of an IML file and conversion to speech directives is a time consuming task involving multiple passes through the IML file. By separating the IML interpretation and the presentation steps, the overall experience for the end-user can be enhanced by reducing execution overhead. Further, by performing IML interpretation and generation of VXML scripts as a separate step, content creators are afforded an opportunity to customize the VXML scripts and grammars prior to presentation.

As noted above, in a preferred embodiment, application programs can be invoked dynamically by means of the BINDING attribute. Both the GUI and Speech renderers provide an informal interface by which application programs may return data to the IML multi-modal presentation manager. An example of such data might be a list of options derived from a dynamic database query which will be presented to the user for selection. To accommodate this functionality, the multi-modal presentation manager provides a mechanism to build grammars dynamically.

VoiceXML makes extensive use of grammars in order to optimize speech recognition functions by reducing match requirements. In a preferred embodiment, the VoiceXML browser loads grammar files at initialization time and keeps them allocated throughout processing (although VoiceXML does provide a directive to force reloading of grammars (the caching=safe attribute of the grammar tag)). In the JSAPI environment, while JSAPI also keeps grammars allocated during execution, it does provide commands by which it is possible to dynamically update specific grammar rules. Preferably, the IML multi-modal presentation manager utilizes these JSAPI commands to dynamically update grammar rules which are initially created during the analysis phase of the IML processing. With JSAPI, once a grammar file has been loaded, new grammar rules cannot be inserted into the grammar. Thus, in a preferred embodiment, during the analysis phase, the IML multi-modal presentation manager will pre-allocate grammar rules to correspond to all potential input components.

The following discussion provides details regarding preferred modes of operation of the systems described above with reference to FIGS. 1 and 2.

IML Parsing and Analyses

Figure 4:
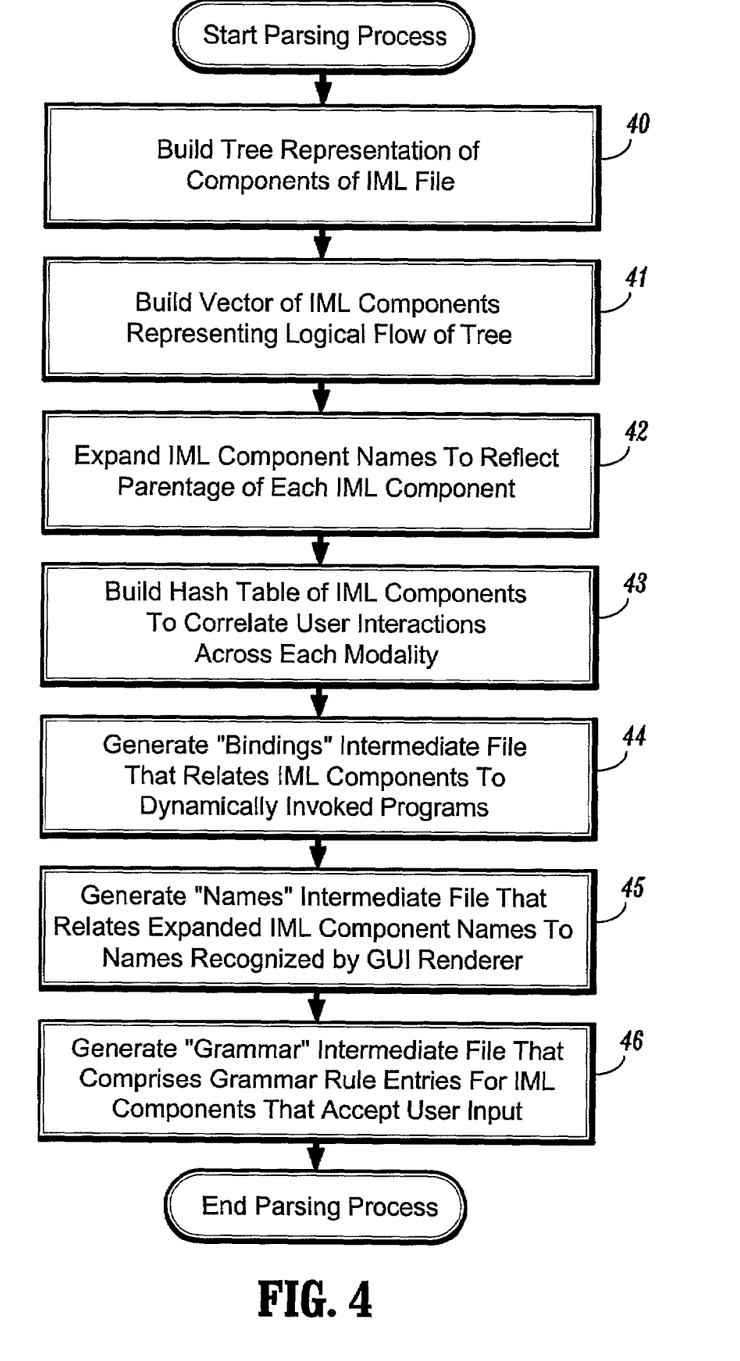
FIG. 4 is a flow diagram of a method for parsing an intent-based script according to one aspect of the present invention.

Referring now to FIG. 4, a flow diagram illustrates a method for parsing and analyzing an IML script according to one aspect of the present invention. As indicated above, in a preferred embodiment, the multi-modal presentation manager 11 processes an IML file by parsing the IML tags and attributes and building a set of internal vectors and hash tables that represent the navigable components of the IML script. Initially, the IML file is parsed to build a tree representation of the components of the IML file (step 40). It is to be appreciated that in a preferred embodiment wherein IML is based on XML, parsing may be performed using any conventional XML parser functions. The IML is parsed in conformance to the DTD (document type definition) referenced in the IML file.

Once initial XML parsing has occurred, the tree is traversed to analyze the logical flow of the IML script and to build a vector of IML components to represent the flow (step 41). Further, since multiple IML tags representing "choice" selections may be aggregated to build voice prompts, aggregation occurs in step 41. Next, IML component names are expanded to reflect the parentage of each IML component (step 42). Thus a STRING named Doctor which occurs in a CHOICE named Title which is defined within a DATA-GROUP named Person will have the expanded name Person_Title_Doctor. Then, a hash table of IML components keyed by an expanded name derived from the IML parentage of each component is built to enable subsequent correlation of user interactions between the GUI and speech rendering modes (step 43). An intermediate file (e.g., the Bindings file 27 (FIG. 1)) which relates IML components to dynamically invoked user supplied application programs is produced (step 44). An intermediate file (e.g., the Names file 27 (FIG. 1)) which relates expanded IML component names to names recognized by the IML GUI renderer is produced (step 45). An intermediate grammar file (e.g., the Grammar file 25 (FIG. 1)) is also produced (step 46) which comprises a grammar rule entry for each IML component capable of accepting input, as well as standard navigational grammar aids. As explained below, the grammar rules may be updated at the time of rendering by application program return values.

Runtime Synchronization Between UI Modes

In a preferred embodiment, when both Speech and GUI modes are enabled, input events recognized by the GUI renderer will have priority over those recognized by the Speech renderer. Events recognized by the Speech renderer will be reflected back to the GUI renderer and the GUI renderer will take appropriate action on them. The premise is that the GUI renderer will post user listener programs as required.

When running in Speech mode only, events recognized by the Speech renderer will be processed by the Speech Renderer and user listener programs will posted appropriately.

Reflection of Speech Events to GUI Renderer

The GUI renderer builds a dictionary of accessibility components, keyed by IML component names during interpretation of the IML script. When speech events are recognized by the Speech Renderer, the Speech Renderer calls a method that passes the affected IML component name and input value to an object (UpdateGUI) which, in turn, obtains the Java accessibility object defined by the GUI renderer for that component. An Updatevalue method then initiates an action appropriate to the Java Swing component referenced.

By way of example, the following programming code comprises extracts from the Speech Renderer and the UpdateGUI functions which illustrate a preferred mechanism that is implemented to reflect speech events back to the GUI interface. The following example illustrates how text gathered in "dictation" mode is returned to the GUI.

```
Extract from Speech Renderer:
    // did we receive a request to end dictation?
        if (result.getRuleName(0).equalsIgnoreCase("GLOBALSTOPDICTATION"))
            {
            dictationGrammar.setEnabled(false);
            ruleGrammar.setEnabled(true);
            EnableGlobalGrammarRules( );
            recognizer.commitChanges( );
            speak(resources.getString("enddictation"));
            current_entry.entry_component.m_valuespoken = DictationString;
    parameters.put("component_name",current_entry.entry_component.m_name);
            parameters.put("component_value",DictationString);
            parameters.put("component_mainclass","mainUserClass");
            parameters.put("component_panelmgr","m_pm");
            parameters.put("next_visitpage","PersonDetails");
            parameters.put("next_visitentry","NEXTENTRY");
    parameters.put("component_type",current_entry.entry_component.m_element);
            String s2 = updategui.UpdateValue(parameters);
            // go to next entry
            sp_index++;
            NextEntry( );
            recognizer.resume( );
            return;
            }
Extract from updategui:
try
    {
    topClass = Class.forName(iclass);
    java.lang.reflect.Field m = topClass.getDeclaredField("mode");
    Boolean mode = (Boolean)m.get(null);
    boolean bimodal = mode.booleanValue( );
    // if we running as the only renderer, then post the event to the application
    // and return
    if (bimodal == false)
        {
        System.out.println("updategui believes that Speech is the sole renderer");
        System.out.println("updategui posting event");
        java.lang.reflect.Field e = topClass.getDeclaredField("eq");
```

-continued

```
        EventQueue eq2 = (EventQueue)e.get(null);
        SpeechRendererActionEvent eventx = new
SpeechRendererActionEvent((com.ibm.aui.Renderer)
        null, 2002, null, "NewEventBindingText", iname, ivalue);
        eq2.postEvent(eventx);
        return(MakeReturnPage(inextpage, inextentry));
        }
    //if we are running multiple modalities, reflect speech events to the GUI
interface
        java.lang.reflect.Field f = topClass.getDeclaredField(ipmgr);
        PanelManager p = (PanelManager)f.get(null);
        if (p == null)
        {
        System.out.println("Failed locating PanelManager");
        }
        else
        {
        com.ibm.aui.swing.SwingRenderer x =
(com.ibm.aui.swing.SwingRenderer)p.m_renderer;
        if(x = null)
            System.out.println("Failed getting the SwingRenderer");
        // get the accessible GUI object for this IML component
        Object accessibilityObject = x.m_accessibilityDictionary.get(iname);
        if (accessibilityObject == null)
            {
            System.out.println("Couldn't find accessibilityDictionary entry for" +
iname);
            return(MakeReturnPage(inextpage, inextentry));
            }
        if (accessibilityObject instanceof JTextField)
            {
            // get rid of extraneous spaces in input and take action on GUI component
            String textvalue = compressSpaces(ivalue);
            ((JTextField)accessibilityObject).setText(textvalue);
            java.lang.reflect.Field e = topClass.getDeclaredField("eq");
            EventQueue eq2 = (EventQueue)e.get(null);
            // dynamically create event
            SpeechRendererActionEvent eventx = new
SpeechRendererActionEvent((com.ibm.aui.Renderer) null,
                2002, null, "NewEventBindingText2", iname,
ivalue);
            eq2.postEvent(eventx);
            return(MakeReturnPage(inextpage, inextentry));
            }
```

Compressing Spaces in Speech Text Input

As shown in the example above, in some cases it is necessary to remove spaces from text returned by the Speech Renderer. This applies when the user spells out text into a STRING. The recognition engine inserts a space before each letter it returns when resolving spelled input. For instance, if a user spells out "m y space d o g ", the recognition engine will return "m-y--d-o-g" (where - represents a space) to the Speech Renderer, which will in turn pass this on to the GUI.

The method compressSpaces in updategui examines the text gathered by the Speech Renderer. Preferably, if the ratio of the text length to the number of spaces is less than 2, the method squeezes out excess spaces from the text.

Runtime Listener Captures and Enqueues GUI Events

As indicated above, the multi-modal presentation manager 11 implements a thread, CaptureGUIEvents 18 which continually listens for GUI events such as mouse clicks and text entry. When CaptureGUIEvents notices that a GUI event has occurred, it determines the IML component that has been affected, and remembers the event by placing it into the hash table keyed by the IML component name.

Periodic Polling from Speech Renderer for GUI Events Enqueued by the Runtime Listener Preferably, on a periodic basis, the function PollForGUIEvents 20 is invoked from within the speech portion of the renderer to read the hash table built by CaptureGUIEvents 18 and take appropriate action. If multiple GUI actions are taken against a specific IML component during the period in which PollForGUIEvents 20 is dormant, only the most recent action for that component will be handled when PollForGUIEvents 20 gains control.

Reflection of GUI Text Entries Back to Speech Renderer During Immediate Rendition Text events recognized by PollForGUIEvents 20 will cause the text entries to be stored in the appropriate speech IMLComponent associated with the field. The PollForGUIEvents 20 method returns a hash table, keyed by IML Component name, containing the entered text as the value. A method referred to herein as JSAPITest examines this hash table, extracting text values and inserting them into the appropriate speech component value fields.

Reflection of GUI Text Entries Back to Speech Renderer During Deferred Rendition Text events recognized by PollForGUIEvents 20 will cause the text entries to be stored in a VoiceXML variable associated with the appropriate speech IMLComponents. The PollForGUIEvents 20 method invokes a "mini" VoiceXML script which assigns a value to an InputValueSpoken field belonging to the component before returning to the main VXML script.

Translation of Keyed Text Input to Words

Preferably, the PollForGUIEvents method 20 translates some special character text inputs to words in order to prepare aural feedback. In a preferred embodiment, the following translation table is applied:

| | |
|---|---|
| \ | back slash |
| . | dot |
| _ | underscore |
| : | colon |
| / | forward slash |
| - | dash |
| @ | at |
| $ | dollar sign |
| # | pound sign |
| * | asterisk |
| % | percent |
| & | ampersand |

Interpretation of User Speech Inputs Directed to Free-Form Text Areas

In a preferred embodiment, the present invention provides a plurality of modes by which user may enter speech inputs directed to free-form text areas. One mode comprises a "spelling" mode, wherein a standard alphanumeric grammar is automatically provided for each application. A reference to this grammar is automatically assigned to the rules pertaining to each free-form input area. The grammar enables the user to spell out an entry. If IML provides an "alphabetic only" attribute for STRINGs, numerics and other special characters can be filtered from free form input areas. No mode selection is necessary to enter "spelling" mode.

The following is an example of an alphanumeric grammar and its reference in the rule associated with a free-form text area named Initial:

```
public <alphanumeric> = (a|b|c|d|e|f|g|h|i|j|k|l|m|n|o|p|q|r|s|t|u|v|w|x|y|z|"."|" "|
"."|"-"|"."|" "|";"|"*"|"&"|"@"|"!"|"("|")"|"?"|"+"|"="|"\"")"|
"/"|"\"|"{"|"\"|"}"|"["|"]"|
"0"|"1"|"2"|"3"|"4"|"5"|"6"|"7"|"8"|"9"
);
public <Initial> = (<alphanumeric>*);
```

A second mode comprises a "dictation" mode, wherein the user can trigger the activation of an extensive "dictation" grammar by issuing a command such as "start dictation". Preferably, the sequence of events initiated by this command is as follows. First, all active grammar rules are disabled. Then, a grammar rule enabling the system to recognize a "stop dictation" command will be enabled. Next, an extensive dictation grammar will be enabled. Finally, the user may then speak in a "free form" manner. When the user wishes to end this mode of data entry, the user can issue a "stop dictation" command. The dictation grammar will then be disabled, the normal application grammar rules will be enabled, the system will attempt to confirm the spoken entry to the user, and the system will continue to the next navigable component.

Another mode comprises a "choice" mode, wherein a limited grammar rule is applied for a free-form input area. Preferably, the limited grammar is built from either of two sources: an IML VALUE assigned to the area, and/or a list of values returned from a user-supplied application program, invoked as a result of interpretation of an IML BINDING assigned to the area. The former of these sources is, clearly, static in nature. The latter of these sources is dynamic in nature and enables a set of selections to be built from, for instance, an ad hoc database query.

Dynamic Creation of Prompts and Grammars to Accommodate Selection or Choice Lists In certain instances, an application may need to dynamically generate prompts and grammars. For instance, database queries may be needed to extract lists of possible selections. The multi-modal presentation manager 11 supports this by enabling calls to BINDINGs (or user supplied programs) specified within IML. For each IML component that describes an input area, a grammar rule is defined as part of the system initialization. On a predefined basis, the user-written applications (BINDINGs) are invoked by the speech renderer. Certain user-written binding methods referred to herein as getChoicesList return arrays of ItemDescriptor objects. Each ItemDescriptor comprises at least a name string and a value string. The ItemDescriptor strings are utilized to build additions to the grammar rule associated with the IML component by preferably creating a JSML (Java Speech Markup Language) token from the name string and a JSML tag from the value string contained in the ItemDescriptor.

More specifically, the speech renderer calls the JSAPI to: (1) disable the active grammar; (2) update the specific rule pertaining to the IML component; (3) enable the grammar; and (4) commit changes to the recognizer.

Interface Interactions

Preferably, speech interface interactions are limited to improve the usability of speech applications. More specifically, in a preferred embodiment, interface interactions are classified as Prompts, Commands, Inputs, and Feedback. Prompts comprise synthesized utterances which request the user to provide input. Commands comprise utterances issued by the user to effect navigation or to request feedback. Inputs comprise utterances issued by the user in response to a prompt. Feedback comprises synthesized utterances which provide contextual or global information to a user.

Standard Commands

To further improve the usability of speech applications, preferably, a limited number of commands are utilized. This approach greatly simplifies the processing required by the Speech Renderer, and provides the user with predictable results. In a preferred embodiment, the standard commands are expressed as Java Speech Grammar Format (JSGF) compliant grammar rules, which provide a mechanism to filter the possible user speech inputs and resolve them to an appropriate meaning.

Preferably, the present invention implements a set of standard commands expressed as grammar rules to facilitate user interaction with the system. The componentname is the label or caption of a component. For instance, navigation commands emulate point-and-click GUI navigation by enabling a user to move to any component. Contextual feedback commands such as "Spell", "What is Help", "What is hint", "What did you say", provide contextual information to the user regarding the named or current component and, when completed, cause navigation to the component for which information was requested.

General information commands such as "Help" and "Describe Application" provide more global information to the user, and when completed, cause navigation back to the prior context.

The following comprises preferred commands and corresponding results:

| | |
|---|---|
| Go to componentname | Navigate to the component |
| Spell componentname | Spell out the value associated with the component |
| Next | Navigate to the next sequential component |
| Back | Navigate to the prior component |
| Yes | Response to boolean prompts |
| No | Response to boolean prompts |
| Start Dictation | Prepare to use dictation grammar for text input |
| Stop Dictation | Disable dictation grammar |
| What are the choices? | Describe the list of choices for the component |
| What did you say? | Repeat the prompt |
| What is the hint for componentname | Play back the IML <HINT> for the component |
| What is the help for the componentname | Play back the IML <HELP> for the component |
| Help | Describe how to use the IML Presentation Mgr. |
| Describe Application | Describe the characteristics of the current application |
| Stop | Interrupt descriptions and return to prior context |

Command Grammar Rules

Preferred grammar rules to implement the standard commands are as follows:

Customizing Standard Commands

An application designer may wish to customize standard commands for a variety of reasons, including, among others, support for national languages. The preferred standard commands described above may be customized by including an override in the properties file associated with the immediate mode Speech Renderer. Preferably, properties files associated with this mode of rendition conform to the following naming convention:

The first three characters of the file name are "res_".

The next two characters of the file name conform to standards for country abbreviation. For example "en": English; "fr" Francaise; "de" Deutsch.

```
public <SPELLcomponentname> = (Spell componentname) {SPELLcomponentname};
where component name is the label of a text field
public <ENTcomponentname> = ([go to] componentname) {ENTcomponentname};
where component name is the label of a text field
public <HINTn> = ([please] [describe] [explain] [what is] [the] hint [for] componentname)
{HINTn};
where component name is the label of a text field and n is a sequence number
public <HELPn> = ([please] [describe] [explain] [what is] [the] help [for] componentname)
{HELPn};
where component name is the label of a text field and n is a sequence number
public <GLOBALSTOP> = ([go to] Stop) {GLOBALSTOP};
public <GLOBALDESC> = ([tell me about] [describe] [this] Application [description])
{GLOBALDESC};
public <GLOBALNEXT> = ([go to] next) {GLOBALNEXT};
public <GLOBALBACK> = ([go] back) {GLOBALBACK};
public <GLOBALTAKEDICTATION> = ([Take] [Begin] [Start] Dictation)
{GLOBALTAKEDICTATION};
public <GLOBALSTOPDICTATION> = ([Stop] [Finish] [End] [Quit] Dictation)
{GLOBALSTOPDICTATION};
public <GLOBALCONTEXTCHOICES> = (What [are] [my] [the] choices [are there])
{GLOBALCONTEXTCHOICES};
public <GLOBALWHAT> = (What did you say) {GLOBALWHAT};
public <GLOBALNUMBER> = (is) {GLOBALSINGLE} | (was) {GLOBALSINGLE} | (are)
{GLOBALPLURAL} | (were) {GLOBALPLURAL};
public <GLOBALOFFSET> = (first) {0} | (next) {+1} | (previous) {-1} | (last)
{GLOBALLAST};
```

The remainder of the file name is ".properties". To customize a particular standard command, a line is provided in the properties files which is keyed by the command name and a value which conforms to the JSGF specification. For example, to override GLOBALSTOP such that users say "HALT" rather than "STOP" the following line should be included in res_en.properties:
GLOBALSTOP>=(Halt) {GLOBALSTOP};

Standard Prompts and Messages

As described above, the multi-modal presentation manager follows the principle of providing a limited user interface when generating prompts from IML scripts. While it is possible and sometimes desirable to present a GUI using extremely terse text prompts, these prompts must be expanded to be understandable in a speech interface. GUIs can take advantage of the notion that "a picture is worth a thousand words" while speech interfaces are linear and can only rely in a very limited fashion on contextual meaning.

Prompts are generated during the analysis of the IML input scripts and are preferably derived by combining an appropriate entry from the properties file as described above with the IML component name or values. Standard prompt entries in the .properties file are as follows:
prompt=Please enter
changeit=Do you want to change it?
selectit=Do you want to select
takedictation=Please begin dictating The multi-modal presentation manager classifies the interaction which a user may take affecting a particular field as belonging to one of the following categories, and during the analysis phase, generates prompts appropriately:
Boolean selections (YES/NO);
Selections from a list;
Freeform inputs which may be spelled or dictated; and
Edit/Revision commands.

Feedback

As noted above, feedback comprises synthesized utterances generated in response to user actions or occurrence of recognized events such as a timer expires. Feedback is generated automatically to acknowledge certain types of user input commands. Standard feedback entries in the properties file are as follows:
nohint=Sorry, there isn't any more information for that field;
curvalue=The current value is;
interrupt=Don't interrupt me!;
enddictation=Finished Dictation;.
yousaid=OK, you said; and
yourchoices=Your choices are.

Additional feedback is generated in response to the SPELL command.

Further, reject messages are generated to indicate that speech inputs could not be successfully resolved. Reject messages may be customized by means of the properties file described above. Preferably, reject messages are extracted from the properties file at execution time. Reject message identifiers preferably conform to the naming convention <"reject" n>where "reject" is the literal string reject and n is a sequence number starting at zero and increasing by 1 with each new reject message. To make the interface more interesting, reject messages are cycled through by the speech interface.

Exemplary reject messages as defined in the properties file are as follows:
reject0=excuse me?
reject1=speak up
reject2=hello, anybody home?

Next, inactivity messages are generated to indicate that no speech inputs have been received within a specified period. Inactivity messages may be customized by means of the .properties file described above. Preferably, inactivity messages are extracted from the .properties file at execution time. Inactivity message identifiers preferably conform to the naming convention <"inactivity" n> where "reject" is the literal string reject and n is a sequence number starting at zero and increasing by 1 with each new inactivity message. To make the interface more interesting, inactivity messages are cycled through by the speech interface.

Exemplary inactivity messages as defined in the properties file are as follows:
inactivity0=hello?
inactivity1=is anyone home?
inactivity2=I don't have all day. Shake a leg.

Voice-activated Editing of Text Fields

Preferably, the present invention provides a mechanism for voice-activated entry of text into a field and subsequent editing of text fields via voice. A set of commands is provided to emulate cursor placement and editing functions such as insertion and deletion.

Navigation Through Long Lists

Preferably, the present invention provides a mechanism for navigation through lists, wherein lists of choices are grouped in subsets so that they can be "scrolled" to make them more manageable. Preferably, number and offset parameters are included in the global grammar rules to support commands such as:
How many choices are there?
What are the first four choices?
What are the next two choices?
What is the third choice?
What are the last three choices?
What is the first choice?
What is the last choice?
What was the previous choice?
What were the previous three choices?
What is the next choice?
What are the next ten choices?

The above exemplary commands above demonstrate plurality, offset, and quantity. Plurality is indicated by the key words "is, are, was, and were". Offset is indicated by the key words "first, last, previous, next". Quantity is indicated either by an explicit number, such as "two, three, four" or by the absence of an explicit number, which implies a quantity of one. The following are exemplary Grammar rules reflecting plurality and offset:
 public<GLOBALNUMBER>=(is) {GLOBALSINGLE}|(was) {GLOBALSINGLE}|(are) {GLOBALPLURAL}|(were) {GLOBALPLURAL};
 public<GLOBALOFFSET>=(first) {0}|(next) {+1}|(previous) {-1}|(last) {GLOBALLAST};

Furthermore, navigation through tables and rows can be handled in a similar fashion to lists as discussed above.

It is to be understood that the systems and methods described herein may be implemented in various forms of hardware, software, firmware, special purpose processors, or a combination thereof. In particular, the present invention is preferably implemented as an application comprising program instructions that are tangibly embodied on a program storage device (e.g., magnetic floppy disk, RAM, ROM, CD ROM, etc.) and executable by any device or machine comprising suitable architecture. It is to be further understood that, because some of the constituent system components and process steps depicted in the accompanying Figures are preferably implemented in software, the actual connections between such components and steps may differ depending upon the manner in which the present invention is programmed. Given the teachings herein, one of ordinary skill in the related art will be able to contemplate these and similar implementations or configurations of the present invention.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for presenting an application in a plurality of modalities, comprising the steps of:

retrieving a modality-independent document from one of local and remote storage, wherein the modality-independent document is an intent-based document that describes user interaction with the application separate from application content and presentation;

parsing the modality-independent document using parsing rules obtained from one of local or remote storage;

converting the modality-independent document to a first intermediate representation that can be rendered by a speech user interface modality;

converting the modality-independent document to a second intermediate representation that can be rendered by a GUI (graphical user interface) modality;

building a cross-reference table by which the speech user interface can access components comprising the second intermediate representation;

rendering the first and second intermediate representations in their respective modality; and receiving a user input in one of the GUI and speech user interface modalities to enable multi-modal interaction and control the document presentation.

2. The method of claim 1, wherein the GUI and speech user interface modalities are synchronized in the document presentation.

3. The method of claim 1, wherein the first intermediate representation is stored in local system memory for immediate rendering.

4. The method of claim 1, wherein the step of converting the modality-independent document to the first intermediate representation comprises transcoding the modality-independent document to a speech markup script.

5. The method of claim 4, wherein the step of rendering comprises the step of deferred rendering of the speech markup script.

6. The method of claim 4, wherein the speech markup script is stored on a local persistent storage device.

7. The method of claim 4, wherein the speech markup script comprises VXML (Voice eXtensible Markup Language).

8. The method of claim 1, further comprising the step of executing an applications program when a corresponding event call occurs within the modality-independent document.

9. The method of claim 8, wherein the step of executing an applications program comprises updating existing grammar rules with data values returned from the applications program.

10. The method of claim 8, wherein the step of executing an applications program comprises updating content values associated with a component of the modality-independent document using data values returned from the applications program.

11. The method of claim 1, further comprising the step of registering a program to be executed upon completion of a specified event.

12. A program storage device readable by machine, tangibly embodying a program of instructions executable by the machine to perform the method steps of claim 1.

13. A method for providing global help information when presenting a modality-independent document, the method comprising the steps of:

preparing an internal representation of a structure and component attributes of the modality-independent document, wherein the modality-independent document is an intent-based document that describes user interaction with the application separate from application content and presentation;

building a grammar comprising rules for resolving specific spoken requests;

processing a spoken request utilizing the grammar rules; and presenting an aural description of the modality-independent document in response to the spoken request, wherein presenting an aural description of the modality-independent document comprises providing global help information by presenting document components, attributes, and methods of interaction.

14. A program storage device readable by machine, tangibly embodying a program of instructions executable by the machine to perform the method steps of claim 13.

15. A method for providing contextual help information when presenting a modality-independent document, the method comprising the steps of:

preparing an internal representation of a structure and component attributes of the modality-independent document, wherein the modality-independent document is an intent-based document that describes user interaction with the application separate from application content and presentation;

building a grammar comprising rules for resolving specific spoken requests;

processing a spoken request utilizing the grammar rules; and presenting an aural description of the components, attributes, and methods of interaction of the modality-independent document in response to the spoken request to provide contextual help information.

16. The method of claim 15, wherein the step of building a grammar comprises the step of combining values obtained from data stored in one of local storage, remote storage, and a combination thereof, with values obtained from an analysis of the modality-independent document.

17. A program storage device readable by machine, tangibly embodying a program of instructions executable by the machine to perform the method steps of claim 15.

18. A method for providing feedback information when presenting a modality-independent document, the method comprising the steps of:

preparing an internal representation of the structure and component attributes of the modality-independent document, wherein the modality-independent document is an intent-based document that describes user interaction with the application separate from application content and presentation;

building a grammar comprising rules for resolving specific spoken requests;

processing a spoken request and resolving the spoken request utilizing the grammar rules;

obtaining state and value information regarding specified components of the document from the internal representation of the document; and presenting an aural description of the content values associated with document components in response to the spoken request to provide feedback information.

19. The method of claim 18, wherein the step of building a grammar comprises the step of combining values obtained from data stored in one of local storage, remote storage, and a combination thereof, with values obtained from analysis of the document.

20. A program storage device readable by machine, tangibly embodying a program of instructions executable by the machine to perform the method steps of claim 18.

21. A method for aurally spelling out content values associated with components of a modality-independent document, the method comprising the steps of:

preparing an internal representation of a structure and component attributes of the modality-independent document, wherein the modality-independent document is an intent-based document that describes user interaction with the application separate from application content and presentation;

building a grammar comprising rules for resolving specific spoken requests;

processing a spoken request utilizing the grammar rules;

obtaining state and content value information regarding specified components of the document from the internal representation of the document; and presenting each character of the content value information requested in response to the spoken request.

22. The method of claim 21, wherein the step of presenting each character of the content value information comprises the step of inserting pauses between each character of the content value information to be presented.

23. The method of claim 21, wherein the step of building a grammar comprises the step of combining values obtained from data stored in one of local storage, remote storage, and a combination thereof, with values obtained from an analysis of the document.

24. A program storage device readable by machine, tangibly embodying a program of instructions executable by the machine to perform the method steps of claim 21.

25. A system for presenting an application in a plurality of modalities, comprising:

a multi-modal manager for parsing a modality-independent document to generate a traversal model that maps components of the modality-independent document to at least a first and second modality-specific representation, wherein the modality-independent document is an intent-based document that describes user interaction with the application separate from application content and presentation;

a speech user interface manager for rendering and presenting the first modality-specific representation in a speech modality;

a GUI (graphical user interface) manager for rendering and presenting the second modality-specific representation in a GUI modality;

an event queue monitor for detecting GUI events;

an event queue for storing captured GUI events; and a plurality of methods, that are called by the speech user interface manager, for synchronizing I/O (input/output) events across the speech and GUI modalities.

26. The system of claim 25, wherein the methods for synchronizing I/O events comprise a first method for polling for the occurrence of GUI events in the event queue and a second method for reflecting speech events back to the GUI manager and posting speech events to the multi-modal manager.

27. The system of claim 25, further comprising a method for invoking user-specified programs that are specified in the modality-independent document.

28. The system of claim 25, wherein the multi-modal manager comprises a main renderer that instantiates the GUI manager, the speech user interface manager, and a method for capturing GUI events.

29. The system of claim 25, wherein the speech user interface manager comprises JSAPI (Java speech application program interface).

30. The system of claim 25, wherein the speech user interface manager comprises a VoiceXML browser.

31. The system of claim 30, further comprising a transcoder for generating a VoiceXML script from the modality-independent document.

* * * * *